(12) United States Patent
Honkanen

(10) Patent No.: US 10,131,319 B2
(45) Date of Patent: Nov. 20, 2018

(54) MULTI-RANGE VEHICLE ACCESS SYSTEMS

(71) Applicant: Huf North America Automotive Parts Manufacturing Corp., Milwaukee, WI (US)

(72) Inventor: Matthew R. Honkanen, Northville, MI (US)

(73) Assignee: Huf North American Automotive Parts Manufacturing Corp., Milwaukee, WI (US)

( * ) Notice: Subject to any disclaimer, the term of this patent is extended or adjusted under 35 U.S.C. 154(b) by 115 days.

(21) Appl. No.: 15/108,720

(22) PCT Filed: Dec. 30, 2014

(86) PCT No.: PCT/US2014/072669
§ 371 (c)(1),
(2) Date: Jun. 28, 2016

(87) PCT Pub. No.: WO2015/103204
PCT Pub. Date: Jul. 9, 2015

(65) Prior Publication Data
US 2016/0325710 A1    Nov. 10, 2016

Related U.S. Application Data

(60) Provisional application No. 61/922,315, filed on Dec. 31, 2013.

(51) Int. Cl.
*B60R 25/01* (2013.01)
*B60R 25/20* (2013.01)
(Continued)

(52) U.S. Cl.
CPC ............ *B60R 25/01* (2013.01); *B60R 25/209* (2013.01); *B60R 25/2081* (2013.01);
(Continued)

(58) Field of Classification Search
CPC ... B60R 25/01; B60R 25/2081; B60R 25/209; B60R 25/24; B60R 25/245;B60R 2325/101; G07C 9/00182; G07C 9/00309; G07C 2009/00341; G07C 2009/00349; G07C 2009/00507;
(Continued)

(56) References Cited

U.S. PATENT DOCUMENTS 6,101,428 A    8/2000   Snyder
6,472,999 B1   10/2002  Lin
(Continued)

FOREIGN PATENT DOCUMENTS

DE    10334625 A1   3/2005
EP    0629759 A1    12/1994
(Continued)

OTHER PUBLICATIONS

International Searching Authority, International Search Report and Written Opinion for PCT Application No. PCT/US2014/072669, dated Apr. 17, 2015.

*Primary Examiner* — Anne M Antonucci
*Assistant Examiner* — James E Stroud
(74) *Attorney, Agent, or Firm* — Honigman Miller Schwartz and Cohn LLP; Matthew H. Szalach; Jonathan P. O'Brien

(57) ABSTRACT

The present disclosure addresses methods for increasing and varying the range of control of wireless systems used in vehicles. The present invention enables varying ranges which allow a user, for example, to activate lights when an authorized vehicle user is in a close range, and to start the vehicle from a distance before the authorized vehicle user leaves the house. The described systems use variable frequency shift keying, variations in power transmissions, and user defined ranges that can be modified through Bluetooth communications.

24 Claims, 2 Drawing Sheets

(51) Int. Cl.
*B60R 25/24* (2013.01)
*G07C 9/00* (2006.01)
*H04L 27/12* (2006.01)
*H04W 4/80* (2018.01)

(52) U.S. Cl.
CPC ............ *B60R 25/24* (2013.01); *B60R 25/245* (2013.01); *G07C 9/00182* (2013.01); *G07C 9/00309* (2013.01); *H04L 27/122* (2013.01); B60R 2325/101 (2013.01); G07C 2009/00341 (2013.01); G07C 2009/00349 (2013.01); G07C 2009/00507 (2013.01); G07C 2009/00547 (2013.01); G07C 2009/00769 (2013.01); G07C 2009/00793 (2013.01); G07C 2209/63 (2013.01); *H04W 4/80* (2018.02)

(58) Field of Classification Search
CPC .......... G07C 2009/00547; G07C 2009/00793; G07C 2009/00769; G07C 2209/63; H04L 27/122; H04W 4/008
USPC .............................................................. 701/2
See application file for complete search history.

(56) References Cited

U.S. PATENT DOCUMENTS

| | | | |
|---|---|---|---|
| 8,334,758 B2* | 12/2012 | Baruco | B60R 25/245 340/12.1 |
| 9,047,716 B1* | 6/2015 | Ghabra | G07C 9/00309 |
| 2001/0038328 A1 | 11/2001 | King | |
| 2005/0168322 A1 | 8/2005 | Appenrodt | |
| 2006/0061458 A1 | 3/2006 | Simon | |
| 2008/0079603 A1 | 4/2008 | King | |
| 2011/0257817 A1 | 10/2011 | Tieman | |
| 2014/0354404 A1* | 12/2014 | Lin | G07C 9/00182 340/5.64 |
| 2015/0022332 A1* | 1/2015 | Lin | B60R 25/20 340/426.1 |
| 2015/0077226 A1* | 3/2015 | Lin | H04W 52/0229 340/5.72 |

FOREIGN PATENT DOCUMENTS

| | | |
|---|---|---|
| FR | 2934223 A3 | 1/2010 |
| GB | 2317729 A | 4/1998 |
| GB | 2431521 A | 4/2007 |

\* cited by examiner

MULTI-RANGE VEHICLE ACCESS SYSTEMS

CROSS-REFERENCE TO RELATED APPLICATIONS

This application is the national phase of International Application No. PCT/US2014/072669, filed Dec. 30, 2014, which claims the benefit of U.S. Provisional Patent Application No. 61/922,315 filed Dec. 31, 2013, the discloses of which are hereby incorporated by reference in their entirety.

BACKGROUND OF THE INVENTION

In recent years, wireless communications have become increasingly important in a number of vehicle control systems. Remote vehicle entry transmitters/receivers, for example, are used for locking and unlocking a vehicle door, unlatching a trunk latch, or activating or deactivating an alarm system equipped on the vehicle. This remote entry device is commonly referred to a remote keyless entry (RKE) fob. The RKE fob is typically a small rectangular or oval plastic housing with a plurality of depressible buttons for activating each one of the wireless operations. The RKE fob is carried with the operator of a vehicle and can wirelessly perform these functions when within a predetermined reception range of the vehicle. The RKE fob communicates with an electronic control module within the vehicle via a RF communication signal.

More recently, complex embedded electronic systems have become common to provide access and start functions, and to provide wide ranging functions to improve driver safety and convenience. These systems include Passive Entry and Passive Start (PEPS) systems. In PEPS systems, a remote receiver and transmitter (or transceiver) is carried with the user in a portable communication device such as a key fob or a card. The portable communication device when successfully challenged transmits a radio frequency (RF) signal to a module within the vehicle for performing a variety of remote vehicle function such door lock/unlock, enabling engine start, or activating external/internal lighting. Passive entry systems include a transmitter and receiver (or transceiver) in an electronic control module disposed within the vehicle. The transceiver is typically in communication with one or more devices (e.g., door lock mechanism) for determining when a request for actuation of a device is initiated (e.g., lifting a door handle) by a user.

Upon sensing the request for actuation, the transceiver broadcasts a passive entry interrogating signal. The fob upon receiving the interrogating signal from the ECU, the portable communication device determines if the interrogating signal is valid. If it is determined a valid signal, then the fob automatically broadcasts an output signal which includes an encrypted or rolling identification code to the electronic control module. The electronic module thereafter determines the validity of the output signal and generates a signal to the device to perform an operation (e.g., the door lock mechanism to unlock the door) if the output signal is determined valid.

Although a number of vehicles functions can be controlled using wireless systems, the range of control is generally limited to one or two different range, and for RKE only. The ranges are set and typically not meant to be configurable. It is, however, desirable to vary the distance from which functions can be provided. For example, to limit draw on the battery, it is desirable to activate lights when an authorized vehicle user is in a close range. To start a vehicle in cold weather, for example, it is desirable to start the vehicle from a distance, before the authorized vehicle user leaves the house. The present disclosure addresses these and other issues.

SUMMARY OF THE INVENTION

In one aspect, the present disclosure provides a wireless communications system for an automotive vehicle. The system comprises a control unit in the automotive vehicle including a transceiver configured to receive signals from a fob, and a fob comprising a transceiver and a control unit. The fob is configured to transmit a data packet to the control unit in the automotive vehicle using a frequency shift keying protocol with a low tolerance for deviation to transmit a command signal, and to transmit a second data packet using a frequency shift keying protocol having a high tolerance for deviation, wherein the control unit in the automotive vehicle executes the command signal received in the first transmission when the vehicle controller receives and decodes the second transmission.

In another aspect, the fob is configured to transmit a data packet to the control unit in the automotive vehicle using a high power signal to transmit a command signal, and transmitting a second data packet using a low power signal, wherein the control unit in the automotive vehicle executes the command signal received in the first transmission when the vehicle controller receives and decodes the second transmission.

In yet another aspect, the disclosure provides a wireless communications system with user-adjustable ranges of communications. The control comprises a control unit in the automotive vehicle including a transceiver configured to receive signals from a fob paired to the vehicle and in communication with a memory storing data identifying one or more fob paired to the vehicle and identifying one or more Bluetooth device paired with the fob paired to the vehicle. A fob comprising a transceiver and a control unit is configured to communicate with the automotive vehicle and a paired Bluetooth device, and the Bluetooth device is programmed to provide a user interface to select a range for activating one or more vehicle control function and to transmit the selected range to the control unit in the automotive vehicle and to store the range in the memory.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
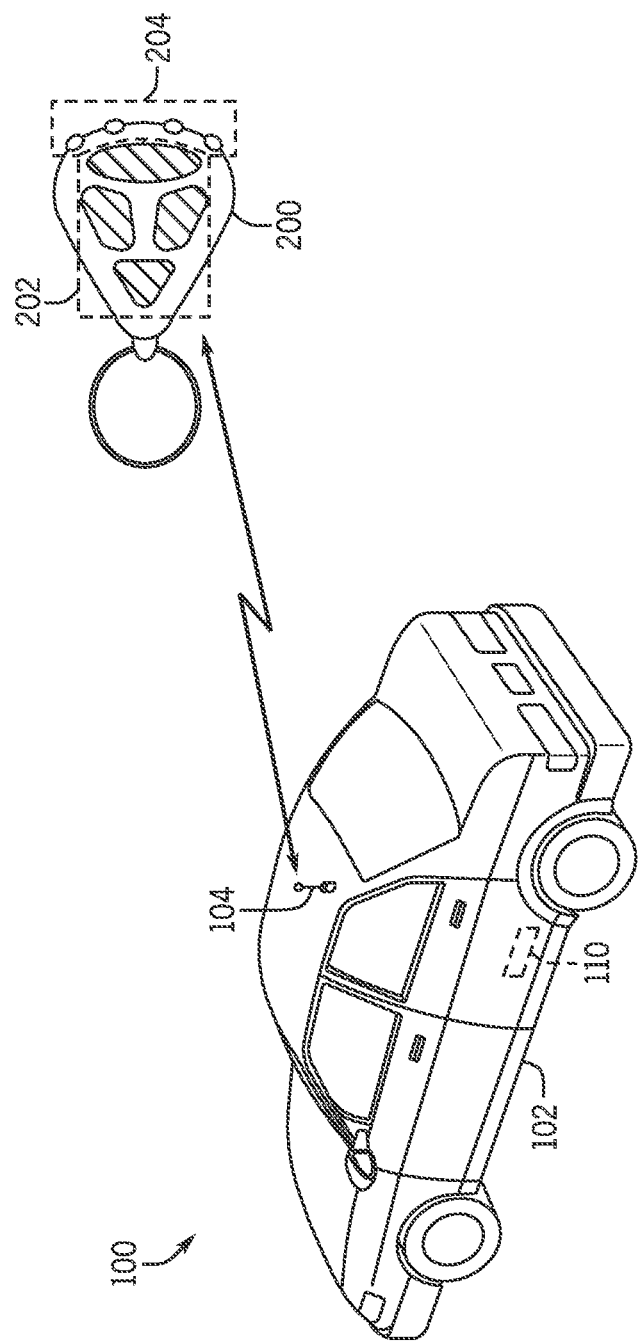
FIG. 1 illustrates a wireless vehicle communication system including a vehicle, vehicle transceiver module, and an antenna communicating with a mobile electronic user device.

Referring to FIG. 1, a wireless vehicle communication system 100 is shown. The system 100 comprises a vehicle 102 including a vehicle transceiver module 110 having an antenna 104 communicating with a mobile electronic user device 200, which here is shown and described as a key fob. It will be apparent that the mobile electronic user device 200 can be many types of application-specific or personal computerized devices, including, for examples, transponder cards, personal digital assistants, tablets, cellular phones, and smart phones. Communications are typically described below as bi-directional between the vehicle transceiver module and the key fob 200 and other devices, although it will be apparent that in many applications one way communications will be sufficient.

The key fob 200 can include one or more user input device 202 and one or more user output or alert devices 204. The user input devices 202 are typically switches such as buttons that are depressed by the user. The user output alert devices 204 can be one or more visual alert, such as light emitting diodes (LEDs), a liquid crystal display (LCD), and audible alarm, or a tactile or vibratory device. A single function can be assigned to each input device 202 or user alert devices 204, or a combination of input devices or a display menu could be used to request a plethora of functions via input device sequences or combinations. Key fobs can, for example, provide commands to start the vehicle, provide passive entry (i.e., automatic unlocking of the doors of the vehicle 102 when key fob 200 is within a predetermined proximate distance of the vehicle 102), activate external and internal vehicle lighting, preparation of the vehicle locking system, activation of a vehicle camera for vehicle action in response to camera-detected events, opening windows, activating internal electric devices, such as radios, telephones, and other devices, and adjustment of driver preferences (e.g., the position of the driver's seat and the tilt of the steering wheel) in response to recognition of the key fob 200. These functions can be activated input devices 202 or automatically by the vehicle 102 detecting the key fob 200. Although a single key fob is shown here, it will be apparent that any number of key fobs could be in communication with the vehicle transceiver module, and the vehicle transceiver module 110 and corresponding control system could associate a different set of parameters with each key fob.

In addition, the vehicle transceiver module 110 can activate output or alert devices 204 to notify the vehicle user that the key fob 200 is within communication distance or some other predetermined distance of the vehicle 102; notify the vehicle user that a vehicle event has occurred (e.g., activation of the vehicle security system), confirm that an instruction has been received from the key fobs 200, or that an action initiated by key fob 200 has been completed.

Figure 2:
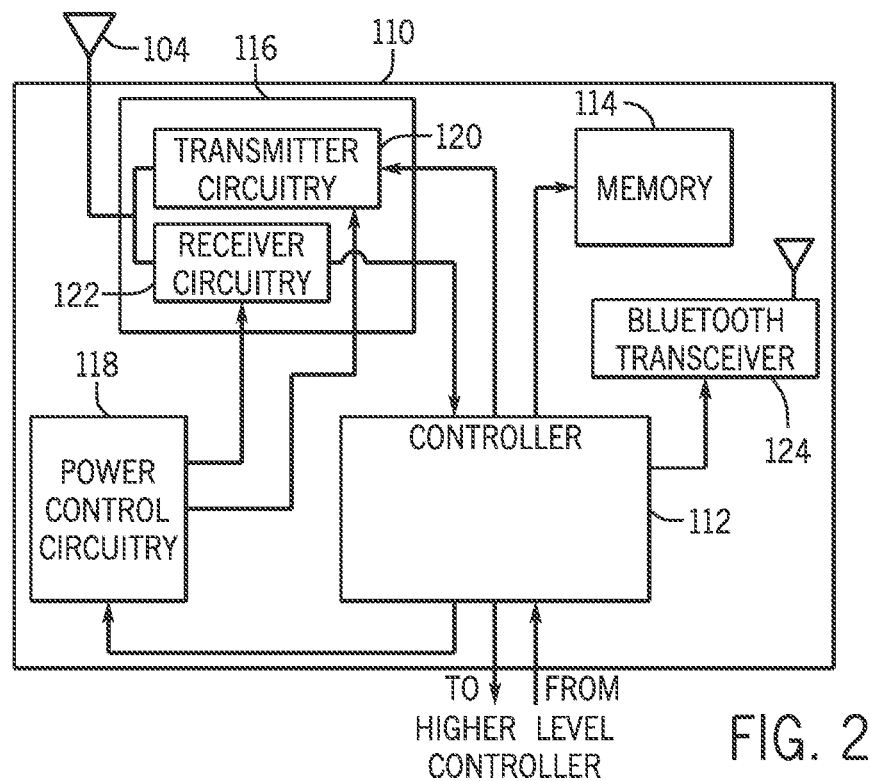
FIG. 2 is a block diagram of an exemplary vehicle transceiver module that can be used in accordance with the disclosed system.

Referring now to FIG. 2, a block diagram of an exemplary vehicle transceiver module 110 that can be used in accordance with the disclosed system is illustrated. The vehicle transceiver module 110 includes a processor or controller 112, memory 114, a power supply 118, and transceiver circuitry 116 communicating through the antenna 104.

The transceiver circuitry 116 includes receiver circuitry 122 and transmitter circuitry 120 for bi-directional communications. The receiver circuitry 122 demodulates and decodes received RF signals from the key fob 200, while the transmitter provides RF codes to the key fob 200, as described below. Although a bi-directional device is described, it will be apparent that one direction communications could also be provided. As described below, the transceiver circuitry can also be provided in a single channel, or in a plurality of channels. In some applications, a Bluetooth transceiver 124 for one way or bi-directional communications with an external Bluetooth enabled device, such as a cellular telephone, smart phone, computing device such as a laptop, tablet, PDA, or other device. The memory 114 in transceiver module 110 can store, for example, data identifying key fobs 200 that are authorized to access the vehicle 102, and can also store corresponding identifying data for Bluetooth devices that are paired with the corresponding key fobs 200 to provide programmable ranges, as described below.

The memory 114 stores data and operational information for use by the processor 112 to perform the functions of the vehicle transceiver module 110, and to provide the vehicle function(s) described above. The controller 112 is also coupled to a higher level vehicle controller or controllers (not shown), which can include, for example, a vehicle bus such as a Controller Area Network (CAN) bus system and corresponding vehicle control system, and can both receive command signals from the vehicle control system and provide command signals and other information to the vehicle control system. Information available to other devices from the CAN bus or other online vehicle bus may include, for example, vehicle status information regarding vehicle systems, such as ignition status, odometer status (distance traveled reading), wheel rotation data (e.g., extent of wheel rotation), etc. Vehicle status data can also include status of electronic control systems including among others, Supplemental Restraint Systems (SRS), Antilock Braking Systems (ABS), Traction Control Systems (TCS), Global Positioning Systems (GPS), Environmental monitoring and control Systems, Engine Control Systems, cellular, Personal Communications System (PCS), and satellite based communication systems and many others not specifically mentioned here.

The transceiver 116 is coupled to the antenna 104 for receiving radio frequency (RF) signals from the key fob 200 and transmitting signals to the key fob 200. Although the antenna 104 is shown as being external to the vehicle transceiver module 110 and on the exterior of the vehicle 102, the antenna 104 may also be implemented within the confines of the vehicle 120 or even within the vehicle transceiver module. A number of antennas can be embedded, for example, in the headliner of a vehicle, or elsewhere within a vehicle. Although a bi-directional transceiver 110 is shown, it will be apparent that one way communications from the key fob 200 to the vehicle 102, or from the vehicle to the key fob 200 can also be provided, and that both a transmitter and receiver would not be required.

Figure 3:
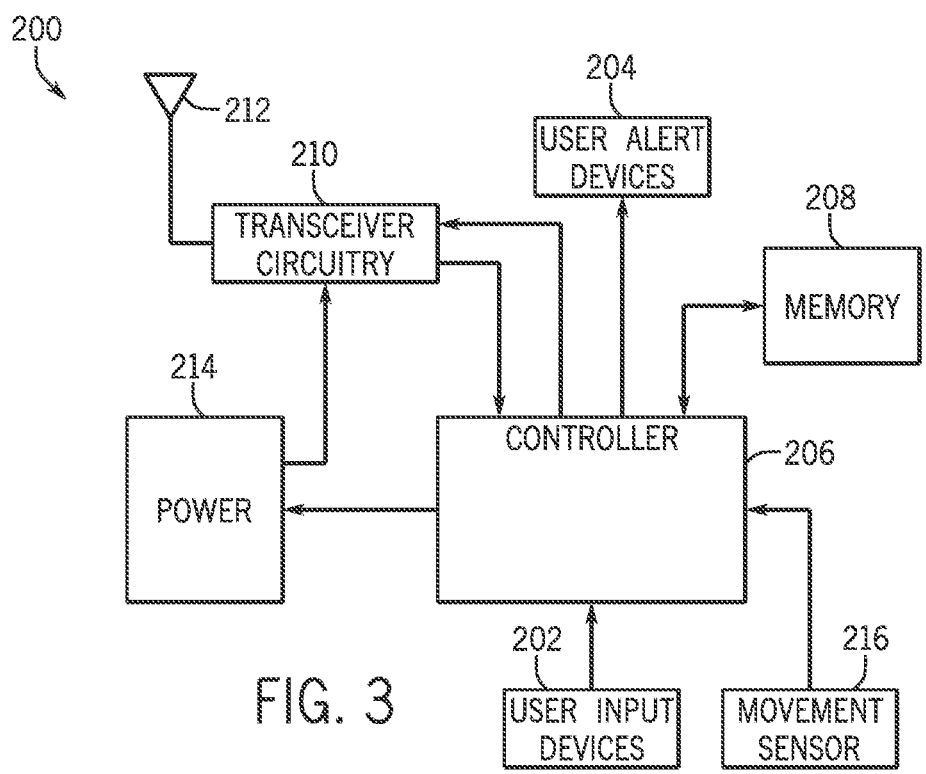
FIG. 3 is a block diagram of an exemplary key fob that can be used in accordance with the disclosed system.

Referring now to FIG. 3, a block diagram of an exemplary key fob 200 that can be used in accordance with the disclosed system includes a controller 206, memory 208, transceiver 210 and corresponding antenna 212, and a power supply 214 (such as a battery). User input devices 202 and user alert devices 204 are in communication with the controller 206. The transceiver circuitry 210 includes receiver circuitry and transmitter circuitry, the receiver circuitry demodulating and decoding received RF signals to derive information and to provide the information to the controller or processor 206 to provide functions requested from the key fob 200. The transmitter circuitry encodes and modulating information from the processor 206 into RF signals for transmission via the antenna 212 to the vehicle transceiver 110.

Although many different types of communications systems could be used, conventional vehicles typically utilize four short-range RF based peer-to-peer wireless systems, including Remote Keyless Entry (RKE), Passive Keyless Entry (PKE), Immobilizer and Tire Pressure Monitoring System (TPMS). RKE and TPMS typically use the same high frequency with different signal modulation (315 MHz for US/NA, 433.32 MHz for Japan and 868 MHz for Europe), whereas the PKE system often requires a bidirectional communication at a low frequency (125 KHz) between the key fob and the receiver module and a unidirectional high frequency communication from key fob to the receiver module. The Immobilizer system also typically uses a low frequency bidirectional communication between the key fob and the receiver module. Receivers for these systems are often standalone and/or reside in various control modules like Body Control Module (BCM) or Smart Junction Block (SJB). By using different radios with different carrier frequencies and/or modulation schemes, collisions between transmissions from separate wireless communication systems in the vehicles can be avoided.

The antenna 212 located within the fob 200 may be configured to transmit long-range ultra-high frequency (UHF) signals to the antenna 104 of the vehicle 100 and receive short-range Low Frequency (LF) signals from the antenna 104. However, separate antennas may also be included within the fob 200 to transmit the UHF signal and receive the LF signal. In addition, antenna 104 and other antennas in the vehicle may be configured to transmit LF signals to the fob 200 and receive UHF signals from the antenna 212 of the fob 200. Also, separate antennas may be included within the vehicle 102 to transmit LF signals to the fob 200 and receive the UHF signal from the fob 200.

The fob 200 may also be configured so that the fob controller 206 may be capable of switching between one or more UHF channels. As such, the fob controller 206 may be capable of transmitting a response signal across multiple UHF channels. By transmitting the response signal across multiple UHF channels, the fob controller 206 may ensure accurate communication between the fob 200 and the vehicle transceiver 110.

Referring still to FIG. 3, a motion detection device, such as a movement sensor 216, can optionally be included in the key fob 200 to detect movement of the key fob 200. The controller 206 can, for example, utilize the motion or lack of motion detected signal from the movement sensor 216 to place the key fob 200 in a sleep mode when no motion is detected for a predetermined time period. The predetermined time period during which no motion is detected that could trigger the sleep mode could be a predetermined period of time or a software configurable value. Although the motion detection device is here shown as part of the key fob, a motion detection device could additionally or alternatively be provided in the vehicle 102.

The vehicle transceiver 110 may transmit one or more signals without an operator activating a switch or pushbutton on the fob key 200, including a wakeup signal intended to activate a corresponding fob 200. The fob 200 may receive signals from the transceiver 110 and determine the strength or intensity of the signals (Received Signal Strength Indication (RSSI)), which can be used to determine a location of the fob 200.

The wireless signals may be modulated in any fashion known in the art, such as by Amplitude Shift Keying ("ASK") or Frequency Shift Keying ("FSK"). transmitted together or separately.

Variable FSK Deviation

Referring again to FIG. 2, in a first method for providing multi-range capabilities with a key fob, frequency shift keying is used. In frequency shift keying, digital information is transmitted through discrete frequency changes of a carrier wave. Here, binary FSK can be advantageously used to provide digital communications at a pair of discrete frequencies. Here, a first frequency or "mark" frequency is used to transmit a "1" and a second or "space" frequency is used to transmit the "0."

For one way communications from the key fob 200 to the vehicle transceiver 110, data packets identifying a vehicle function are transmitted at a pre-defined frequency bandwidth with a low tolerance for deviation, and therefore a relatively high immunity to noise. These signals are detected by the receiver 120 in the vehicle transceiver 110, and can be decoded by vehicle controller 112. When a complete command sequence (e.g. door open, start vehicle, activate lights, etc.) is received, the action can be stored in memory 114. The vehicle control 112 does not perform the function, however, but waits until a second signal is received. The second signal is transmitted in a different frequency range, and has been filtered with a high tolerance for deviation. The second signal, therefore, is more susceptible to noise, and is therefore reliably detected when the key fob 200 is closer to the vehicle 102 than when the initial command transmission is made. The distance can be adjusted based on the amount of deviation. Different deviations can correspond to different command levels. For example, the frequency range of the second signal transmitted can be selected to be in a wider range than the bandwidth of the controller 112. The bandwidth of controller 112 can be increased to allow additional noise to be received and hence reduce the overall sensitivity, causing additional attenuation of the received second signal and reducing the sensitivity further. By adjusting the width of the frequency range of the second signal transmitted relative to the bandwidth of the controller 112 (wider or narrower), the distance can be fine-tuned for different command levels.

In an alternate embodiment, FSK communications from the key fob 200 to the vehicle receiver 120 can be made on two different channels. The first channel can be, as described above, filtered within a fairly tight tolerance of a selected frequency. The second channel operates within a higher bandwidth tolerance range. As described above, a command signal is transmitted through the first channel. When a full command is received, the command can be stored in memory 114. The vehicle controller 112, however, does not activate the function until a signal is received on the second channel. Because of the higher tolerance bandwidth, the receiver 120 in the vehicle controller 110 typically will be unable to decode the second signal until the key fob 200 is within a closer range of vehicle 102.

A similar process can be used for bi-directional communications between the vehicle 102 and the key fob 200. For bi-directional communications, the key fob 200 can initially send a signal to the receiver 120 in vehicle transceiver 110 to wake up the vehicle 102. The control 112 in vehicle 102 sends an acknowledgement signal to the key fob 200 using a different FSK bandwidth. Here, the key fob 200 can store a command until the fob 200 determines receives the signal transmitted by the vehicle 102, when the vehicle 102 is within a predetermined distance of the fob 200. When the vehicle 102 is sufficiently close, the key fob 200 can send the command to the vehicle for use by the vehicle controller. For bi-directional communications, two channels can also be used, as described above.

Reduced Power Transmission

In another embodiment, a series of data packets are transmitted from the key fob 200 to the vehicle 102 at full power. The receiver 120 in the vehicle controller 110 receives the full power transmissions, and the controller 112 decodes the transmission. When a full command is received, the command is stored in memory 114, but no action is taken. The key fob 200 transmits low power signals and, when the controller 112 receives the low power signal, the key fob is known to be within a predetermined distance, and the command can be activated. Different power levels can be corresponded with different commands. The different power levels can be applied at the bit level, byte level or packet level, and the controller 112 can decode the low power signals at the predetermined distance.

In an alternate embodiment, the receiver 120 in the vehicle 102 receives communications on two separate channels, a high power channel, and a low power channel. Here, a command is transmitted from the key fob 200 on the high power channel. The command can be decoded by controller 112 and stored in memory 114. The receiver 120 then waits for a transmission from the key fob 200 on the low power channel. When the transmission is received, the key fob 200 is within a predetermined distance of the vehicle 102, and the command can be activated.

In another alternate embodiment, a high power and low power transmission are used in a bidirectional communications system. For bi-directional communications, the key fob 200 can initially send a high power signal to the receiver 120 in vehicle transceiver 110 to wake up the vehicle 102. The control 112 in vehicle 102 sends an acknowledgement signal to the key fob 200 using a low power signal. Here, the key fob 200 can store a command until the fob 200 determines receives the signal transmitted by the vehicle 102, and therefore when the vehicle 102 is within a predetermined distance of the fob 200.

User Defined Ranges

In another embodiment of the invention, a Bluetooth device such as a smart phone or personal computing device can be paired with key fob 200 and the vehicle 102. When the Bluetooth device, key fob 200 and vehicle 102 are all in communication, the pairing of the Bluetooth device, key fob 200 and vehicle 102 can be verified. An application executed on the Bluetooth device can then be used to establish ranges for activating different devices, which can be transmitted to the vehicle control 112 and stored in memory 114. The ranges can be established by adjusting the power or tolerance of the bandwidth of communications, as described above.

Although specific embodiments are described above, it will be apparent to those of ordinary skill that a number of variations can be made within the scope of the disclosure For example, although bidirectional communications between the vehicle and remote control, passive entry, and sensor devices is shown and described, one-way communications can also be used. Although a key fob is described above, it will be apparent that various types of personal communication devices including smart phones, laptops, tablets, computers, and other devices can be used as a key fob controller or in addition to a key fob. It should be understood, therefore, that the methods and apparatuses described above are only exemplary and do not limit the scope of the invention, and that various modifications could be made by those skilled in the art that would fall within the scope of the invention. To apprise the public of the scope of this invention, the following claims are made:

I claim:

1. A wireless communications system for an automotive vehicle comprising:
    a control unit in the automotive vehicle including a vehicle transceiver; and
    a fob comprising a fob transceiver and a control unit, the fob configured to (i) transmit a first data packet, including a command signal, to the control unit in the automotive vehicle using a frequency shift keying protocol with a low tolerance for deviation, and (ii) transmit a second data packet, after the first data packet, using a frequency shift keying protocol having a high tolerance for deviation,
    wherein the control unit in the automotive vehicle executes the command signal when the control unit in the automotive vehicle receives and decodes the second data packet, and
    wherein the vehicle transceiver is configured to receive signals from the fob.

2. The wireless communications system of claim 1, wherein the frequency shift keying protocol comprises a mark frequency for transmitting a 1 and a space frequency for transmitting a 0.

3. The wireless communications system of claim 1, wherein the control unit in the automotive vehicle comprises a memory, and the memory stores a received command sequence.

4. The wireless communications system of claim 3, wherein the command sequence comprises at least one of a door open command sequence, a start vehicle command sequence, and an activate lights command sequence.

5. The wireless communications system of claim 1, wherein the control unit in the automotive vehicle delays until the second data packet is received before activating the command signal.

6. The wireless communications system of claim 1, wherein the frequency shift keying communications from the fob to the vehicle transceiver are made on two different channels, wherein a first channel of the two different channels is filtered within a fairly tight tolerance of a selected frequency, and a second channel of the two different channels operates within a higher bandwidth tolerance range.

7. The wireless communications system of claim 6, wherein the command signal is transmitted through the first channel, and the control unit in the automotive vehicle delays to execute the command signal until a signal is received on the second channel.

8. The wireless communications system of claim 6, wherein the control unit in the automotive vehicle is configured to vary a distance between the fob and the automotive vehicle for executing the command signal based on the frequency shift keying protocol.

9. The wireless communications system of claim 1, further comprising transmitting a signal to the vehicle transceiver to wake up the automotive vehicle.

10. The wireless communications system of claim 1, further comprising a second channel for bi-directional communications.

11. The wireless communications system of claim 1, wherein the control unit in the automotive vehicle comprises a memory configured to store the command signal of the first data packet.

12. A wireless communications system for an automotive vehicle comprising:

a control unit in the automotive vehicle including a vehicle transceiver; and a fob comprising a fob transceiver and a control unit, the fob configured to (i) transmit a first data packet, including a command signal, to the control unit in the automotive vehicle using a high power signal, and (ii) transmit a second data packet, after the first data packet, using a low power signal, wherein the control unit in the automotive vehicle executes the command signal when the control unit in the automotive vehicle receives and decodes the second data packet, and wherein the vehicle transceiver is configured to receive signals from the fob.

13. The wireless communications system of claim 12, wherein the high power signal is a full power transmissions.

14. The wireless communications system of claim 12, wherein the control unit in the automotive vehicle delays after a full command is received until a low power signal is received.

15. The wireless communications system of claim 14, wherein the low power signal indicates that the fob is within a predetermined distance of the automotive vehicle, and the command signal can be activated.

16. The wireless communications system of claim 14, wherein signals having different power levels correspond to different commands.

17. The wireless communications system of claim 12, wherein the high power signal and the low power signal are transmitted on different channels.

18. The wireless communications system of claim 12, wherein the high power and low power signals are used in a bidirectional communications system, and wherein the fob initially transmits a high power signal to the vehicle transceiver to wake up the automotive vehicle, the control unit in the automotive vehicle transmits an acknowledgement signal to the fob using the low power signal.

19. The wireless communications system of claim 12, wherein the second data packet corresponds to a second command signal different than the command signal.

20. The wireless communications system of claim 12, wherein the control unit in the automotive vehicle is configured to vary a distance between the fob and the automotive vehicle for activating the command signal based on a power level of the high power signal and the low power signal.

21. A wireless communications system for an automotive vehicle comprising:

a control unit in the automotive vehicle including a vehicle transceiver and a memory;

a fob paired to the automotive vehicle and comprising a fob transceiver and a control unit, the fob configured to communicate with the automotive vehicle and a paired Bluetooth device, wherein the Bluetooth device is programmed to provide a user interface to select a range for activating one or more vehicle control function and to transmit the selected range to the control unit in the automotive vehicle and to store the range in the memory; and wherein the vehicle transceiver is configured to receive signals from the fob and is in communication with the memory storing data identifying the fob and identifying one or more Bluetooth device paired with the fob.

22. The wireless communications system of claim 21, wherein the Bluetooth device executes an application to establish ranges for activating different devices, which can be transmitted to the control unit in the automotive vehicle and stored in memory.

23. The wireless communications system of claim 22, wherein the ranges are established by adjusting a power of a bandwidth of communications.

24. The wireless communications system of claim 22, wherein the ranges are established by adjusting a tolerance of a bandwidth of communications.

* * * * *